United States Patent
Amodei et al.

[11] 3,773,400
[45] Nov. 20, 1973

[54] PROCESS FOR FIXING HOLOGRAPHIC PATTERNS IN ELECTRO-OPTIC CRYSTALS AND THE CRYSTALS PRODUCED THEREBY

[75] Inventors: Juan Jose Amodei, Langhorne, Pa.;
David Lloyd Staebler, Trenton, N.J.

[73] Assignee: RCA Corporation, New York, N.Y.

[22] Filed: Oct. 10, 1972

[21] Appl. No.: 295,851

Related U.S. Application Data

[63] Continuation-in-part of Ser. No. 144,905, May 19, 1971, abandoned.

[52] U.S. Cl. .............................. 350/3.5, 350/150
[51] Int. Cl. ............................................. G02b 27/00
[58] Field of Search ........................... 350/3.5, 150; 340/173 LT, 173 SS; 96/27 H

[56] References Cited
UNITED STATES PATENTS
3,544,189  12/1970  Chen et al. ..................... 350/3.5

OTHER PUBLICATIONS

Johnston, Jour. of Applied Physics, Vol. 41, No. 8, July, 1970, pp. 3279–3285

Chen, Jour. of Applied Physics, Vol. 40, No. 8, July, 1969 pp. 3389–3396

*Primary Examiner*—David Schonberg
*Assistant Examiner*—Ronald J. Stern
*Attorney*—Glenn H. Bruestle et al.

[57] ABSTRACT

Phase holograms recorded in single crystal electro-optic materials such as undoped or doped lithium niobate and barium sodium niobate doped with iron and molybdenum are fixed so that the holographic pattern is not erased upon readout of the holographic information contained in the crystal. One method for fixing the pattern consists of heating the crystal at an elevated temperature either while or subsequent to writing the holographic pattern in the crystal. An alternate method for fixing the pattern consists of exposing the crystal to ionizing radiation during recording of the holographic information in the crystal.

7 Claims, 3 Drawing Figures

INVENTORS
Juan J. Amodei and
David L. Staebler.

PROCESS FOR FIXING HOLOGRAPHIC PATTERNS IN ELECTRO-OPTIC CRYSTALS AND THE CRYSTALS PRODUCED THEREBY

This application is a continuation-in-part of our co-pending application Ser. No. 144,905 filed May 19, 1971, now abandoned.

The invention herein described was made in the course of or under a contract with the Department of the Navy.

This invention relates to phase holograms recorded in single crystal electro-optic materials and more particularly to a method of fixing these holograms in the materials to prevent erasure during readout. In addition, this invention relates to the electro-optic materials containing the fixed holographic image therein as obtained by the method of this invention. Electro-optic crystals containing fixed holographic patterns therein are particularly useful in read only memories and high capacity image storage and display systems.

BACKGROUND OF THE INVENTION

It has been reported that thick phase holograms can be recorded in single crystal electro-optic materials through diffusion or drift of free carriers which are photo-excited from deep traps. During exposure to a modulated light pattern such as that due to two intersecting coherent beams, free carriers move away from regions of high light intensity and are then retrapped. The resulting charge displacement sets up an electric field pattern in the crystal that in turn modulates the refractive index of the crystal, thus producing a phase hologram. More detailed discussions of phase holograms recorded in single crystal electro-optic materials can be found with reference to, for example, the following articles: F. S. Chen, J. T. LaMacchai and D. B. Fraser, *Applied Physics Letters*, Vol. 13, p. 223, (1968); R. L. Townsend and J. T. LaMacchai, Journal of Applied Physics, Vol. 41, p. 5188, (1970); and J. J. Amodei, *Applied Physics Letters*, Vol. 18, p. 22, (1971).

A major obstacle to the practical use of the aforementioned phase holograms is the sensitivity of the displaced charge to light. Uniform optical illumination, such as that used for readout of the holographic pattern, redistributes the charge and thus erases the hologram. This destructive readout effect is somewhat less apparent at photon energies lower than that used for writing. However, if three dimensional storage capability of the crystal is desired, readout is at the writing wavelength, and erasure of the holograms takes place.

We have provided methods for producing permanent phase holograms in these electro-optic materials. The holographic patterns contained in electro-optic materials which have been treated in accordance with the methods of this invention are not significantly erased upon the impingement of uniform optical illumination during readout of the holographic pattern.

SUMMARY OF THE INVENTION

An electro-optic crystal is treated either shortly prior to, during, or after the recording of a holographic pattern therein so as to produce a light stable ionic charge pattern corresponding to the holographic pattern.

The treated electro-optic crystal contains a holographic pattern therein that is not erased by light of the same wavelength used for recording the pattern. The crystal is also characterized in that during reading, the diffraction efficiency is initially low and then quickly rises to a steady state maximum value.

DETAILED DESCRIPTION OF THE INVENTION

Generally, recording of phase holograms in thick electro-optic crystals consists of generating an interference pattern through the interaction between a coherent reference beam and an object beam. The object beam carries the spatial modulation corresponding to the image to be recorded. The light pattern formed by the interference of the object beam and the reference beam causes a change in the index of refraction of the electro-optic medium. The refraction pattern thereby produced is a three dimensional pattern which is representative of the object. Coherent readout light traversing the electro-optic medium in the direction of the reference beam is phase modulated in accordance with the recorded refractive index pattern, thereby reproducing the object beam through wavefront reconstruction.

Figure 1:
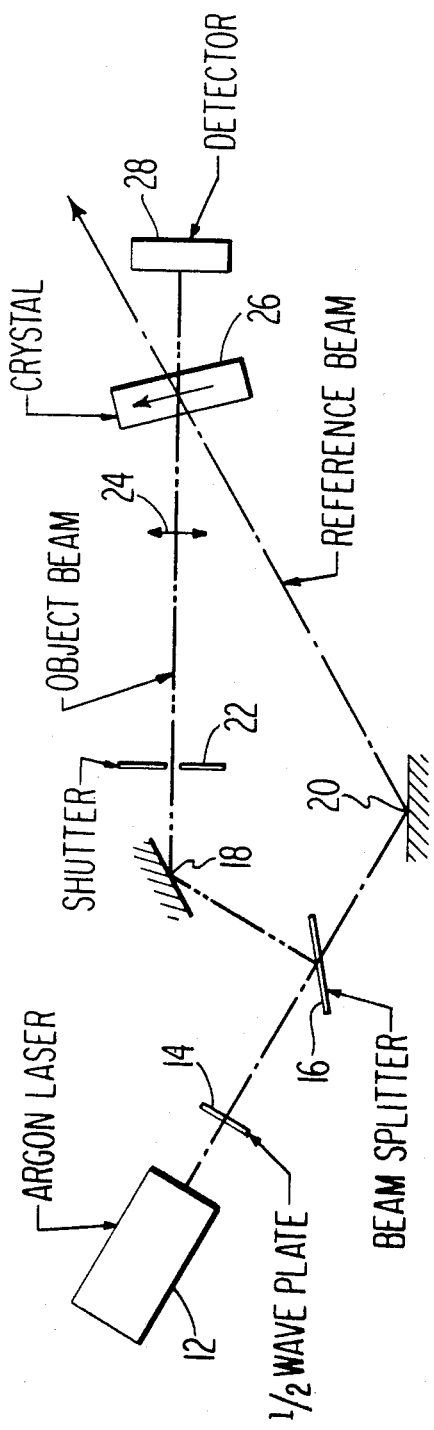
FIG. 1 is a schematic drawing of a system useful for recording and reading holographic information in an electro-optic crystal.

Referring to FIG. 1, there is shown schematically a system useful for recording and reading holographic information in an electro-optic crystal. The system comprises an argon laser 12 which emits coherent light of a wavelength of 4800 A. This light passes through a one-half wave plate 14 to obtain coherent light which is horizontally polarized. The light then passes through a beam splitter 16. A portion of this radiation is reflected from the beam splitter onto a first mirror 18 and the other portion of the radiation passes through the beam splitter onto a second mirror 20. The mirros 18 and 20 are adjusted such that the plane polarized beams reflected from them meet at an angle of 30°. The portion of the beam which is reflected from the beam splitter is termed the object beam and after being reflected from the mirror 18 passes through a shutter 22 and then through the object 24. The portion of the beam which passes through the beam splitter 16 is termed the reference beam. The reference beam and object beam intersect to form the interference pattern. The electro-optic crystal 26 is positioned at the intersection of the reference beam with the crystallographic c axis perpendicular to the bisector of the 30° angle between the reference and object beams. When employing an argon laser having an emission of 4800 A, suitable electro-optic crystals are, for example, doped or undoped $LiNbO_3$ crystals and $Ba_2NaNb_5O_{15}$ crystals doped with iron and molybdenum. The crystals are cut and polished to form parallel faces containing the c axis. The polarization direction of the object and reference beams is horizontal, i.e., in the plane of incidence, as is the c axis of the crystal.

The recorded holographic pattern is read out by closing the shutter, thereby blocking the object beam and allowing only the reference beam to impinge on the crystal. An image of the object will thereby be formed and may be viewed either spatially or on a detector 28 which can be, for example, a silicon solar cell or an image screen.

Unless the electro-optic crystal is treated as subsequently disclosed herein, the holographic pattern formed therein, (which is believed due to electric fields caused by the diffusion or drift of free carriers photoexcited from deep traps in the electro-optic material) is not stable. By this is meant that upon reading the holographic pattern formed in the crystal, the pattern is destroyed.

We have developed methods for "fixing" or stabilizing a holographic pattern in the electro-optic crystal so that a pattern will not be erased during readout of the hologram.

Fixing of the holographic pattern can be achieved by treating the electro-optic crystal to ionizing radiation, such as gamma radiation, just preceding optical recording. More preferably, fixing is achieved by heating the sample at an elevated temperature temporarily during or after optical recording. The preferred process of heating the sample during or after optical recording results in fixed holographic patterns which are extremely stable under illumination by light of the wavelength employed for writing the hologram and is an inexpensive and simple process. There is nothing in the literature which indicates that heating the crystal could result in fixing of the holographic pattern therein.

This fixing of the holographic pattern occurs through ionic drift or reorientation effects which take advantage of the optically generated field to produce an ionic charge pattern corresponding to the original holographic pattern. This ionic charge pattern is generated during or after the normal photon-induced recording of the holographic pattern. The ionic pattern which is produced is not erasable optically.

The stability of a holographic pattern in an electro-optic material under illumination may be measured by blocking the object beam and measuring the light diffracted from the reference beam in the object beam direction. The ratio of the intensity of the diffracted beam to that of the incident reference beam, taking reflection into account, is the diffraction efficiency. A constant and reproducible value of diffraction efficiency is representative of a stable hologram.

Figure 2:
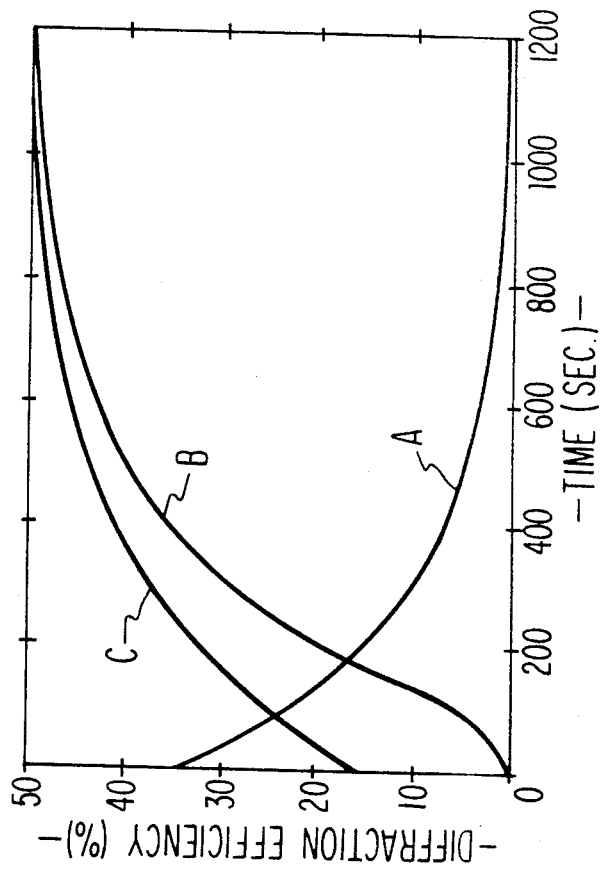
FIG. 2 is a graph plotting the diffraction efficiency in percent versus time for treated and untreated electro-optic crystals.

Referring now to FIG. 2, Curve A shows the decay during readout of a "normal" hologram, i.e., one written without treating the crystal for fixing of the hologram at any time. This hologram was written by exposing a 0.7 cm undoped lithium niobate crystal to the interference pattern of both object and reference beams for 350 seconds, a time sufficient to obtain saturation diffraction efficiency. As indicated by Curve A, during readout of the hologram the uniform reference beam erases the hologram with an exponential time constant of 225 seconds. After reading out the hologram for twice the same time period used to write the hologram, the diffraction efficiency is down by more than an order of magnitude.

A similar hologram was fixed in the same sample by the following procedure. After exposure to both beams for 350 seconds, the crystal was heated in air to about 100°C. for 30 minutes. Upon cooling to room temperature, the crystal was replaced in the system and illuminated with the reference beam. Initially, little diffraction was observed. This is believed due to the fact that the ionic drift had cancelled most of the electronic field pattern. Then, as shown by Curve B, the diffracted beam intensity increased with time during exposure to the readout beam until a diffraction efficiency of about 50 percent was reached, at which point it remained indefinitely. This effect is characteristic of fixed holograms in lithium niobate and barium sodium niobate crystals.

It is believed that one of the reasons for the growth in diffraction efficiency is that uniform readout light will even out the electron distribution, leaving an unneutralized ionic charge pattern behind. Since ions are not excited by light, this pattern is not optically erasable. It is also believed that there is a self-enhancement effect initiated by readout where the reconstructed object beam interferes with the reference beam which then reconstructs the hologram. This latter effect is erasable thus making it possible to determine the diffraction efficiency of the fixed hologram uniquely.

Curve C. of FIG. 2 shows the readout of the hologram of Curve B after the electro-optic crystal has been exposed to either incoherent ultraviolet light or to the reference beam after turning the crystal slightly so that the diffracted beam disappears due to the angular selectivity of the volume hologram. The diffraction efficiency initially observed upon returning the crystal to the proper readout angle as shown by the initial point of Curve C, is 16 percent. The efficiency then increases until it again reaches 50 percent. This effect is completely reversible by retracting Curve C. We refer to the minimum point of Curve C as that due to the fixed hologram, and the subsequent increase as due to self-enhancement.

The electro-optic crystal containing the fixed holographic pattern may be characterized by the effect of self-enhancement of the diffraction efficiency during readout; that is, by the initially low diffraction efficiency which increases to a steady state maximum with time during readout of the fixed holographic pattern. It should also be noted that this change of diffraction efficiency may be dependent upon the polarity of the optical axis of the crystal. By reversing the direction of the c axis during readout from that shown in FIG. 1, an opposite result is obtained. That is, during readout of the fixed hologram, a new hologram is produced that decreases the total diffraction efficiency. This is believed to be due to the linear nature of the electro-optic effect on these materials. That is, the modulation of the index of refraction produced by the "new" electric field pattern is shifted by 180° in phase by a reversal of the c axis. Thus, if it adds for one direction, it will subtract for the other.

Since fixing is due to ionic charge displacements that are insensitive to light, the particular electro-optic crystal employed should contain ions or vacancies that are mobile at the temperature used for fixing and the deep traps of electrons or holes which cause the pattern in the normal holographic process should have a slower thermal activation rate than the ions at the fixing temperature. That is, optical illumination frees the electrons or holes, while heat frees the ions or vacancies. Continuing with the model proposed above, the fixing process occurs in the following sequence: First, an electron field pattern is produced by the displacement of trapped electrons or holes; then at the fixing temperature, ions or vacancies drift so as to reduce the internal field (or polar complexes of these defects reorient themselves to achieve the same end), thereby producing an ionic charge pattern equal and opposite to the electronic charge pattern. When the crystal is then cooled to room temperature, the ionic charge is frozen in and little diffraction is observed because the fields have been cancelled. However, upon illumination with uniform light, the charge in the deep optically ionizable traps tends to uniformly redistribute, leaving an electric field pattern due to the uncompensated ionic charge pattern. The resulting hologram, while not optically erasable at room temperature, can be erased completely by heating the sample either at the temperature of fixing or at higher temperatures for a time long enough to erase, that is, to cause migration of the electrons and holes as well as the ions or vacancies. The holographic pattern can be erased also by exposing the crystal to gamma irradiation or by optical excitation at elevated temperatures.

The particular temperature range suitable for fixing by heating may vary somewhat with the electro-optic material employed. There is a minimum temperature required to achieve fixing in a suitable or reasonable time period and a maximum temperature above which the pattern will fix and erase almost simultaneously. Preferably, the heating temperature is from about 80°C. up to about 180°C.

Figure 3:
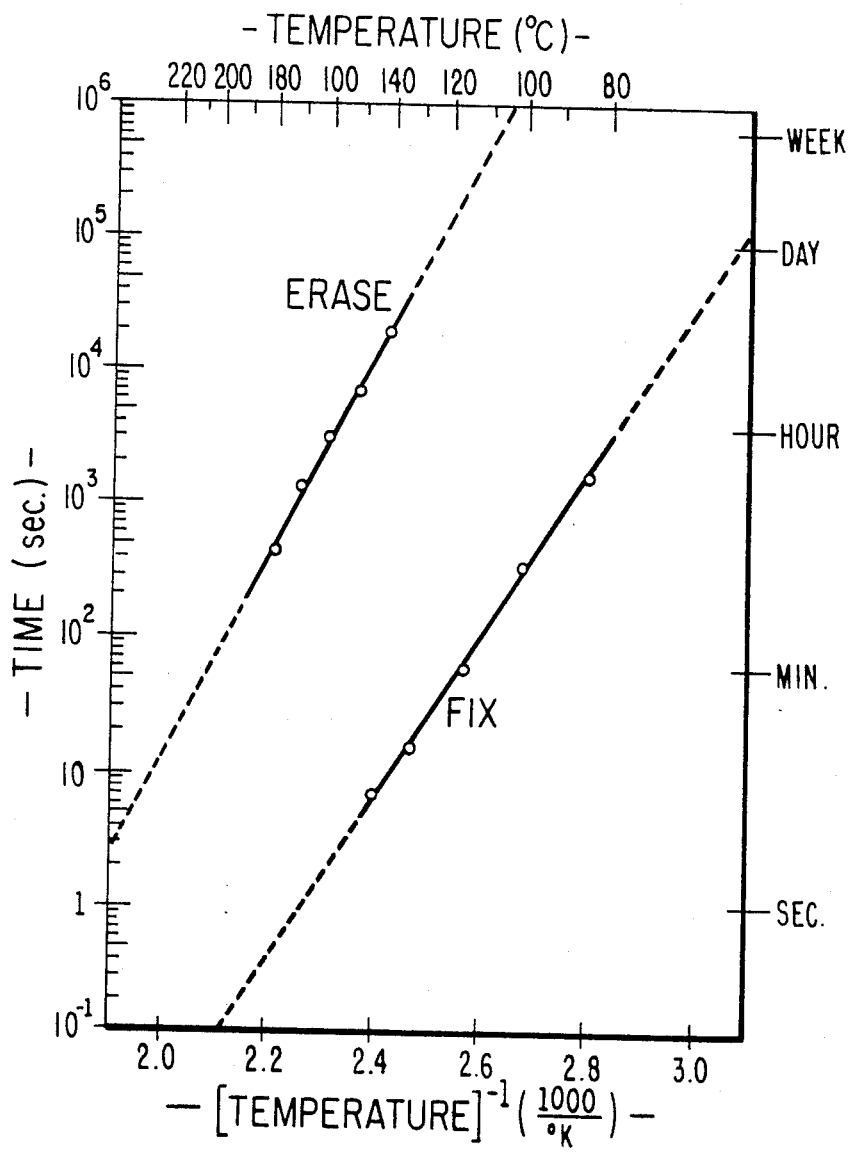
FIG. 3 is a graph plotting the half time required to fix and to erase holographic information in an electro-optic crystal at varying temperatues.

FIG. 3 shows half times for fixing and erasing holograms in a 1.3 cm thick lithium niobate crystal doped with 0.001 percent by weight of iron. The initial diffraction efficiency after fixing was about 8 percent. Referring to FIG. 3, it can be seen that at a temperature of about 140°C., a hologram will be fixed after heating for about 100 seconds and will be erased after heating for about 10 hours. At a higher temperature, about 180°C., only about 0.1 second will be required to fix the hologram, which will be erased after heating about 0.5 hour. Lower temperatures require longer times both to fix and to erase a hologram.

The fixing technique described above has also been employed to fix a number of holograms in a crystal. The holograms were recorded sequentially by turning the crystal and all of the holograms were fixed at once by heating the crystal.

Fixing effects similar to those described above are also obtained by writing one or more holograms while the crystal is held at an elevated temperature and then cooling the electro-optic crystal in the dark to room temperature. As an illustration, a hologram with a stable holographic pattern having a 50 percent diffraction efficiency was recorded in a 0.32 cm thick electro-optic crystal of $Ba_2NaNb_5O_{15}$ doped with 0.036 percent by weight of iron and 0.002 percent by weight of molybdenum while heating at about 100°C.

As another illustration, a crystal of lithium niobate doped with 0.015 percent iron which was 0.86 mm thick, was fixed by heating at about 150°C. while recording a hologram. The fixed holographic pattern had a diffraction efficiency after cooling to room temperature of 60%.

As previously indicated, a stable phase holographic pattern may be produced in an electro-optic crystal by treating the crystal with ionizing radiation prior to recording the phase hologram pattern in the crystal. For example, an undoped lithium niobate crystal was bombarded with $\frac{1}{3} \times 10^6$ roentgens of gamma radiation. Within one-half hour after this radiation bombardment, a phase hologram pattern of an object was formed in the crystal with a writing time of 2–5 minutes. A stable phase hologram image was thereby produced having a diffraction efficiency of >90 percent.

While the writing time for irradiated crystals may be longer than five minutes, it is preferably not less than about two minutes; we have found that writing or recording of a phase hologram for only 50 seconds resulted in an image which decayed upon readout and hence was not fixed.

It should be understood that the fixing technique described above is useful for stabilizing or fixing amplitude modulated holograms as well as phase modulated holograms, and holographic patterns in two dimensions within the electro-optic crystal as well as three dimensional holographic patterns.

We claim:

1. A method for producing one or more light stable phase holograms in an electro-optic crystal which comprises recording a hologram in the form of a spatial pattern in said crystal and fixing said pattern so as to produce an ionic charge pattern to replace the original electronic charge pattern defining the holographic pattern.

2. A method according to claim 1 wherein said fixing is accomplished by heating said crystal during or after recording of said hologram at an elevated temperature for a time sufficient to accomplish fixing but insufficient to erase said hologram and cooling said crystal to room temperature.

3. A method according to claim 1 wherein said fixing is accomplished by irradiating said crystal with ionizing radiation prior to recording.

4. A method according to claim 2 wherein the heating temperature is from about 80°C. to about 180°C.

5. A method according to claim 3 wherein said ionizing radiation is gamma radiation.

6. A method according to claim 1 wherein said crystal is selected from the group consisting of lithium niobate, lithium niobate doped with iron and barium sodium niobate doped with iron and molybdenum.

7. An electro-optic crystal produced by the method of claim 1.

* * * * *